US009807478B2

(12) United States Patent
Song et al.

(10) Patent No.: US 9,807,478 B2
(45) Date of Patent: Oct. 31, 2017

(54) OPTICAL BUFFER AND METHODS FOR STORING OPTICAL SIGNAL

(71) Applicant: Huawei Technologies Co., ltd., Shenzhen (CN)

(72) Inventors: Liang Song, Hangzhou (CN); Yingchun Yang, Hangzhou (CN); Yaoda Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/199,140

(22) Filed: Jun. 30, 2016

(65) Prior Publication Data

US 2016/0316282 A1    Oct. 27, 2016

Related U.S. Application Data

(63) Continuation of application No. PCT/CN2014/071911, filed on Feb. 10, 2014.

(30) Foreign Application Priority Data

Dec. 31, 2013 (CN) ................ PCT/CN2013/091164

(51) Int. Cl.
*H04J 14/00* (2006.01)
*H04Q 11/00* (2006.01)
*H04L 12/863* (2013.01)

(52) U.S. Cl.
CPC ..... *H04Q 11/0005* (2013.01); *H04L 47/6245* (2013.01); *H04Q 11/0003* (2013.01);
(Continued)

(58) Field of Classification Search
CPC ......... H04Q 11/0005; H04Q 2011/002; H04Q 11/0003; H04Q 2011/0016;
(Continued)

(56) References Cited

U.S. PATENT DOCUMENTS 4,815,804 A * 3/1989 Desurvire ............ G02B 6/2861
                                                            359/900
5,103,333 A * 4/1992 Koai .................. H04Q 11/0001
                                                            398/53
(Continued)

FOREIGN PATENT DOCUMENTS

CN          1414728 A      4/2003
CN        101127570 A      2/2008
(Continued)

OTHER PUBLICATIONS

Partial English Translation and Abstract of Japanese Patent Application No. JP4431704, Jun. 12, 2016, 8 pages.
(Continued)

*Primary Examiner* — Hibret Woldekidan
(74) *Attorney, Agent, or Firm* — Conley Rose, P.C.

(57) ABSTRACT

An optical buffer and a method for storing an optical signal using the optical buffer, where the optical buffer includes a first waveguide, a first optical delay waveguide loop and a controller. The first waveguide includes a first arm and a second arm, where a first end of the first arm is an input end of the optical buffer, and a second end of the second arm is an output end of the optical buffer. A second end of the first arm connects to a first end of the second arm. The first optical delay waveguide loop connects to the first arm at a first end using a first optical switch, and a second part of the first optical delay waveguide loop connects to the second arm at a second end using a second optical switch. The controller connects to the first optical switch and the second optical switch respectively.

16 Claims, 6 Drawing Sheets

(52) U.S. Cl.
CPC .......... H04Q 2011/002 (2013.01); H04Q 2011/0016 (2013.01); H04Q 2011/0033 (2013.01); H04Q 2011/0039 (2013.01); H04Q 2213/003 (2013.01)

(58) Field of Classification Search
CPC ... H04Q 2011/0033; H04Q 2011/0039; H04Q 2213/003; H04Q 2011/003; H04J 14/0212; H04L 49/357; H04L 49/6245; G02B 6/2861; G02B 6/3586; G02B 6/3536; G02F 2201/20; G02F 1/21; G02F 1/3133
USPC ...................... 398/45–47, 53, 102
See application file for complete search history.

(56) References Cited

U.S. PATENT DOCUMENTS

| | | | | |
|---|---|---|---|---|
| 5,115,428 | A * | 5/1992 | Ramanan | H04Q 11/0001 370/361 |
| 5,287,316 | A * | 2/1994 | Urushidani | G06E 1/00 365/215 |
| 5,486,943 | A * | 1/1996 | Sasayama | H04Q 11/0001 365/215 |
| 5,493,434 | A * | 2/1996 | Sasayama | H04Q 11/0001 398/47 |
| 5,625,727 | A * | 4/1997 | Liedenbaum | G02F 1/3519 385/16 |
| 5,701,372 | A * | 12/1997 | Magel | G02B 6/2861 385/129 |
| 5,926,589 | A | 7/1999 | Gaeta | |
| 6,421,152 | B1 * | 7/2002 | Yoon | H04J 14/02 398/87 |
| 6,542,269 | B1 * | 4/2003 | Martinelli | H04B 10/299 398/102 |
| 6,559,989 | B1 * | 5/2003 | Kim | H04Q 11/0005 359/108 |
| 6,647,163 | B2 * | 11/2003 | Song | G11C 13/047 359/108 |
| 6,917,739 | B2 * | 7/2005 | Chen | H04Q 11/0005 359/108 |
| 7,324,751 | B2 * | 1/2008 | Khalfallah | H04Q 11/0005 398/45 |
| 7,835,278 | B2 * | 11/2010 | Hesse | H04L 47/56 370/230 |
| 7,835,649 | B2 * | 11/2010 | Epps | H04J 14/0227 398/154 |
| 8,081,852 | B2 * | 12/2011 | Tobing | G02B 6/12007 385/15 |
| 8,582,972 | B2 * | 11/2013 | Small | G06E 3/00 385/122 |
| 9,405,070 | B1 * | 8/2016 | de Valicourt | G02B 6/2861 |
| 9,709,744 | B2 * | 7/2017 | Song | G02F 1/21 |
| 2005/0286830 | A1 * | 12/2005 | Cutolo | G02B 6/26 385/27 |
| 2007/0071449 | A1 | 3/2007 | Kang | |
| 2012/0293856 | A1 | 11/2012 | Onaka | |
| 2013/0236137 | A1 | 9/2013 | Meister et al. | |
| 2013/0315590 | A1 * | 11/2013 | Zhou | H04Q 11/0003 398/48 |
| 2016/0313508 | A1 * | 10/2016 | Song | G02F 1/21 |
| 2017/0127161 | A1 * | 5/2017 | Song | H04Q 11/0003 |

FOREIGN PATENT DOCUMENTS

| | | |
|---|---|---|
| CN | 101258699 A | 9/2008 |
| CN | 101546086 A | 9/2009 |
| CN | 101610435 A | 12/2009 |
| CN | 101621718 A | 1/2010 |
| CN | 101834699 A | 9/2010 |
| CN | 101881859 A | 11/2010 |
| CN | 102111692 A | 6/2011 |
| CN | 102156507 A | 8/2011 |
| CN | 102629067 A | 8/2012 |
| CN | 102638311 A | 8/2012 |
| CN | 103091784 A | 5/2013 |
| EP | 1462833 A2 | 9/2004 |
| JP | 1999352527 A | 12/1999 |
| JP | H11352527 A | 12/1999 |
| JP | 2004296075 A | 10/2004 |
| JP | 2008211530 A | 9/2008 |
| JP | 2009162933 A | 7/2009 |
| JP | 1431704 B2 | 1/2010 |
| JP | 2013130738 A | 7/2013 |
| WO | 02103449 A1 | 12/2002 |
| WO | 2005025112 A2 | 3/2005 |
| WO | 2005103782 A1 | 11/2005 |

OTHER PUBLICATIONS

Partial English Translation and Abstract of Japanese Patent Application No. JP11352527, Dec. 21, 2016, 16 pages.
Ashry, I., et al., "All-Optical Variable Delay Buffer for Next Generation Optical Networks," ICTON, Mo.B1.5, Jun. 27, 2010, 4 pages.
Xia, F., et al., "Ultracompact optical buffers on a silicon chip," Nature Publishing Group, Nature Photonics, vol. 1, Dec. 21, 2006, 7 pages.
Foreign Communication From a Counterpart Application, European Application No. 14875986.3, Extended European Search Report dated Nov. 7, 2016, 6 pages.
Foreign Communication From a Counterpart Application, European Application No. 14876401.2, Extended European Search Report dated Nov. 21, 2016, 9 pages.
Foreign Communication From a Counterpart Application, PCT Application No. PCT/CN2013/091164, English Translation of International Search Report dated Oct. 9, 2014, 2 pages.
Foreign Communication From a Counterpart Application, PCT Application No. PCT/CN2013/091164, English Translation of Written Opinion dated Oct. 9, 2014, 15 pages.
Foreign Communication From a Counterpart Application, PCT Application No. PCT/CN2014/071911, English Translation of International Search Report dated Sep. 12, 2014, 2 pages.
Foreign Communication From a Counterpart Application, PCT Application No. PCT/CN2014/071911, English Translation of Written Opinion dated Sep. 12, 2014, 9 pages.
Foreign Communication From a Counterpart Application, PCT Application No. PCT/CN2013/091148, English Translation of International Search Report dated Jul. 9, 2014, 2 pages.
Foreign Communication From a Counterpart Application, PCT Application No. PCT/CN2013/091148, English Translation of Written Opinion dated Jul. 9, 2014, 7 pages.
Foreign Communication From a Counterpart Application, PCT Application No. PCT/CN2014/071910, English Translation of International Search Report dated Sep. 30, 2014, 3 pages.
Foreign Communication From a Counterpart Application, PCT Application No. PCT/CN2014/071910, English Translation of Written Opinion dated Sep. 30, 2014, 6 pages.
Notice of Allowance dated Apr. 19, 2017, U.S. Appl. No. 15/199,702, filed Jun. 30, 2016, 12 pages.
Foreign Communication From a Counterpart Application, Japanese Application No. 2016-543690, Japanese Office Action dated Jun. 27, 2017, 4 pages.
Foreign Communication From a Counterpart Application, Japanese Application No. 2016-543690, Partial English Translation of Japanese Office Action dated Jun. 27, 2017, 5 pages.

* cited by examiner

:::page
OPTICAL BUFFER AND METHODS FOR STORING OPTICAL SIGNAL

CROSS-REFERENCE TO RELATED APPLICATION

This application is a continuation of International Application No. PCT/CN2014/071911, filed on Feb. 10, 2014, entitled "Annular Optical Buffer and Methods for Storing and Reading Optical Signal," which claims priority to International Patent Application No. PCT/CN2013/091164, filed on Dec. 31, 2013, both of which are hereby incorporated by reference in their entireties.

TECHNICAL FIELD

The present disclosure relates to the field of silicon photonics technologies, and in particular, to an annular optical buffer and methods for storing and reading an optical signal.

BACKGROUND

Compared with electrical interconnection technologies using copper wires as media, optical interconnection technologies using fibers or waveguides as transmission media have significant advantages in a transmission rate, a wideband density, power consumption, costs, and other aspects, become a research focus in recent years, and are developed rapidly.

How to implement an optical packet switching (OPS) system having a large capacity, low costs, and a high port density to satisfy many-core communication is still a technical difficulty at present, because an optical network on chip (ONoC) system integrated with an OPS system needs optical buffer, but there are technical bottlenecks in an aspect of optical buffer at present, for example, a small capacity, a large size, and a difficulty in integration. Therefore, the OPS ONoC system is developed slowly.

Figure 1A:
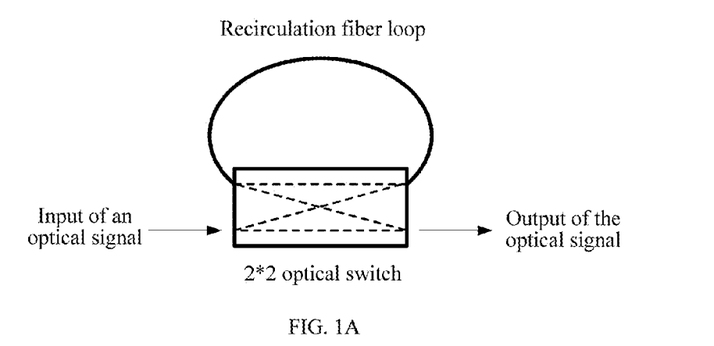
FIG. 1A is a schematic structural diagram of a recirculation fiber loop.
Figure 1B:
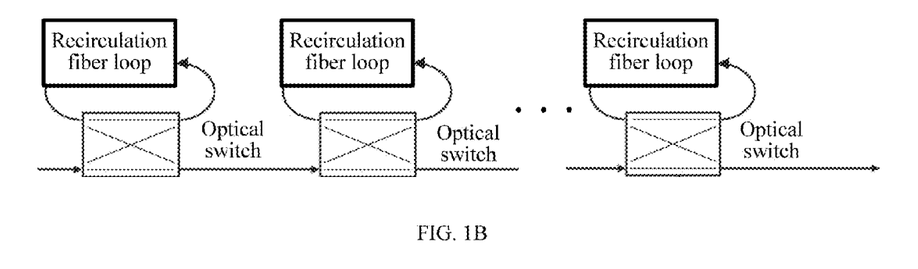
FIG. 1B is a schematic structural diagram of an optical buffer including cascaded recirculation fiber loops.

At present, most optical buffers in the industry use a solution of fiber loops, and a basic unit of an optical buffer temporarily stores an optical signal using a 2×2 optical switch plus a recirculation fiber loop (as shown in FIG. 1A). Further, an optical switch at an entrance of the optical buffer is controlled to be in an on state such that the optical signal enters the recirculation fiber loop, and when the optical signal needs to be output, an optical switch at an exit of the optical buffer is controlled to be in an on state such that the optical signal is output from the optical buffer. An optical buffer including such cascaded basic units is shown in FIG. 1B. When a newly input optical signal enters a first 2×2 optical switch from an entrance on a left side, if a recirculation fiber loop corresponding to the first optical switch already stores first optical signal data, a controller opens a lower right end of the first optical switch, the first optical signal data enters a second 2×2 optical switch through the lower right end of the first optical switch. If a recirculation fiber loop corresponding to the second optical switch also already stores second optical signal data, the controller opens a lower right end of the second optical switch, the second optical signal data enters a next 2×2 optical switch through the lower right end of the second optical switch, and until a recirculation fiber loop corresponding to a particular optical switch stores no optical signal data, an upper right end of this optical switch may be controlled to be opened, and the newly input optical signal enters a recirculation fiber loop through the upper right end of this optical switch such that the newly input optical signal is circularly transmitted in the recirculation fiber loop, that is, a storage function is implemented.

In researches on the prior art, it is found that the prior art has at least the following problems.

All existing optical buffers prolong a transmission time of optical data in a manner of increasing a length of a fiber. However, because a transmission rate of light in the fiber approaches to the speed of light, a fiber delay solution has disadvantages of a small capacity, a large size, and a difficulty in implementation of monolithic integration. The existing optical buffer generally uses a first in first out storage manner, and when an optical signal needs to enter a recirculation fiber loop of a next optical buffer unit through an optical switch of a particular optical buffer unit, and an optical signal temporarily stored in are circulation fiber loop of the particular optical buffer unit exactly needs to be output, the two optical signals are caused to conflict with each other at an output end of a lower right end of the optical switch corresponding to the particular optical buffer unit. Therefore, it is impossible to implement unordered random storage and reading of an optical signal.

SUMMARY

Based on this, embodiments of the present disclosure provide an optical buffer and methods for storing an optical signal, which can implement monolithic integration of an optical buffer and can implement unordered random storage and reading of an optical signal.

According to a first aspect, an annular optical buffer is provided, where the optical buffer includes a first bent straight-through waveguide, n-shaped, connecting an input end and an output end of an optical signal, functioning as a transmission bus of the optical signal, and configured to transmit, to the output end, the optical signal input from the input end, multiple optical delay waveguide loops, arranged transversely and in parallel on two arms of the first bent straight-through waveguide, where on and off of an optical path that is on two sides of each optical delay waveguide loop and the two arms of the first bent straight-through waveguide are implemented using a pair of optical switches, and the multiple optical delay waveguide loops are configured to temporarily store optical signals, multiple pairs of optical switches, whose quantity is the same as that of the multiple optical delay waveguide loops, where each pair of optical switches are configured to control the on and off of the optical path that is on the two arms of the first bent straight-through waveguide and the two sides of the optical delay waveguide loop corresponding to each pair of optical switches, a beam splitter, disposed at an input end of the first bent straight-through waveguide, and configured to obtain a part of optical signal by splitting the optical signal that is input from the input end and transfer the part of optical signal to a controller through a second bent straight-through waveguide, a slow light effect waveguide, disposed on the first bent straight-through waveguide that is between an optical switch closest to the input end and the beam splitter, and configured to slow a transmission rate of an optical signal transmitted within the slow light effect waveguide, and the controller, connected to the beam splitter using the second bent straight-through waveguide, connected to an external device, connected to each optical switch of the foregoing multiple pairs of optical switches using a control signal line, and configured to receive the part of optical signal obtained by performing splitting by the beam splitter, perform optical-to-electrical conversion on this part of opti-
:::

cal signal to obtain an electrical signal, and parse a data packet of the electrical signal, generate an optical signal transmission request according to information obtained by performing the parsing, send the transmission request to the external device, receive an instruction that is sent by the external device and used for storing an optical signal in the annular optical buffer, generate a control signal according to the storage instruction using the information obtained by performing the parsing, send the control signal to a particular optical switch, and control an on-off status of the particular optical switch such that an optical signal transmitted in the first bent straight-through waveguide enters an optical delay waveguide loop corresponding to the particular optical switch, or configured to receive an instruction that is sent by the external device and used for outputting an optical signal temporarily stored in a particular optical delay waveguide loop from the optical delay waveguide loop, generate a control signal according to the output instruction, and send the control signal to a particular optical switch, and control an on-off status of this particular optical switch such that an optical signal that is temporarily stored in an optical delay waveguide loop corresponding to the particular optical switch is output from the optical delay waveguide loop.

In a first implementation manner of the first aspect, the foregoing controller includes an optical-to-electrical converter configured to receive the part of optical signal obtained by performing splitting by the beamsplitter, and perform optical-to-electrical conversion on the part of optical signal to obtain the electrical signal, a data packet parsing unit configured to parse the data packet of the electrical signal, acquire header information of the data packet of the electrical signal, and extract a destination address of the data packet from the header information, a transmission request unit configured to generate the optical signal transmission request according to the destination address, and send the transmission request to the external device, an instruction receiving unit configured to receive the instruction that is sent by the external device and used for storing an optical signal in the annular optical buffer, a storage loop determining unit configured to determine, according to the storage instruction, one optical delay waveguide loop from optical delay waveguide loops that store no optical signal and that are in the annular optical buffer, a mapping relationship establishment unit configured to establish a mapping relationship of the destination address and the determined optical delay waveguide loop using the destination address, obtained by performing the parsing, of the data packet, and send the mapping relationship to a storage unit, a control signal generation unit configured to generate a control signal that is sent to a particular optical switch corresponding to the determined optical delay waveguide loop, where the control signal is used to control an on-off status of the particular optical switch, and the storage unit configured to store the mapping relationship between the destination address and the determined optical delay waveguide loop.

In a second implementation manner of the first aspect, the controller includes the instruction receiving unit, which is further configured to receive the instruction that is sent by the external device and used for outputting an optical signal temporarily stored in a particular optical delay waveguide loop from the optical delay waveguide loop, an instruction parsing unit configured to parse the received output instruction, and extract, from the received output instruction, a destination address of an optical signal needing to be output, the storage loop determining unit, which is further configured to search for a mapping relationship, stored in the storage unit, between the destination address and the optical delay waveguide loop according to the extracted destination address, and determine the optical delay waveguide loop corresponding to the destination address. The control signal generation unit is further configured to generate, according to the output instruction, a control signal that is sent to a particular optical switch corresponding to the determined optical delay waveguide loop, where the control signal is used to control an on-off status of the particular optical switch, and a mapping relationship deletion unit configured to delete the mapping relationship information that corresponds to the determined optical delay waveguide loop and that is stored in the storage unit.

In a third implementation manner of the first aspect, each optical delay waveguide loop includes a slow light effect waveguide segment configured to slow a transmission rate of an optical signal transmitted within the slow light effect waveguide segment.

In a fourth implementation manner of the first aspect, when the optical signal processed by the foregoing annular optical buffer is a wavelength division multiplexing (WDM) optical signal with M wavelengths, where M is an integer and M>1, the slow light effect waveguide segment included by each optical delay waveguide loop includes a wavelength division demultiplexer configured to demultiplex the foregoing WDM optical signal with M wavelengths into M single-wavelength optical signals with different wavelengths, M single-wavelength optical delay waveguide loops configured to respectively perform optical signal delay on the foregoing M single-wavelength optical signals with different wavelengths, and a wavelength division multiplexer configured to perform WDM on the foregoing delayed M single-wavelength optical signals with different wavelengths to obtain a WDM optical signal.

According to a second aspect, a method for storing an optical signal using the foregoing annular optical buffer is provided, where the method includes receiving, by a controller, a part of optical signal obtained by performing splitting by a beamsplitter, performing optical-to-electrical conversion on this part of optical signal to obtain an electrical signal, parsing, by the controller, a data packet of the electrical signal, generating an optical signal transmission request according to information obtained by performing the parsing, sending, by the controller, the transmission request to an external device, receiving, by the controller, an instruction that is sent by the external device and used for storing an optical signal in the annular optical buffer, generating, by the controller, a control signal according to the storage instruction using the information obtained by performing the parsing, sending, by the controller, the control signal to a particular optical switch, and controlling an on-off status of this particular optical switch such that an optical signal transmitted in a first bent straight-through waveguide enters an optical delay waveguide loop corresponding to the particular optical switch.

In a first implementation manner of the second aspect, generating, by the controller, a control signal according to the storage instruction using the information obtained by performing the parsing includes determining, according to the storage instruction, one optical delay waveguide loop from optical delay waveguide loops that store no optical signal and that are in the annular optical buffer, and generating a signal that controls an optical switch on a left side of the determined optical delay waveguide loop to be an "on" state, and after the optical signal is imported into the determined optical delay waveguide loop through the optical switch on the left side, generating a signal that controls the optical switch on the left side to be an "off" state.

In a second implementation manner of the second aspect, in a process of determining, according to the storage instruction, one optical delay waveguide loop from optical delay waveguide loops that store no optical signal and that are in the annular optical buffer, when all optical delay waveguide loops of the annular optical buffer already store optical signals, a communication message for discarding the optical signal is sent to the external device.

In a third implementation manner of the second aspect, after determining, according to the storage instruction, one optical delay waveguide loop from optical delay waveguide loops that store no optical signal and that are in the annular optical buffer, the method further includes establishing a mapping relationship between a destination address and the determined optical delay waveguide loop, and storing the mapping relationship in a storage unit.

According to a third aspect, a method for reading an optical signal using an annular optical buffer is further provided, where the method includes receiving, by a controller, an instruction that is sent by an external device and used for outputting an optical signal temporarily stored in a particular optical delay waveguide loop from the optical delay waveguide loop, generating, by the controller, a control signal according to the output instruction, and sending, by the controller, the control signal to a particular optical switch, and controlling an on-off status of the particular optical switch such that an optical signal that is temporarily stored in an optical delay waveguide loop corresponding to the particular optical switch is output from the optical delay waveguide loop.

In a first implementation manner of the third aspect, generating, by the controller, a control signal according to the output instruction includes parsing the received output instruction, and obtaining, by means of processing, a destination address of an optical signal needing to be output, searching for a mapping relationship, stored in a storage unit, between the destination address and the optical delay waveguide loop according to the destination address obtained by means of processing, and determining the optical delay waveguide loop corresponding to the destination address, and generating, according to the output instruction, a signal that controls an optical switch on a right side of the determined optical delay waveguide loop to be an "on" state, and after the optical signal is exported from the determined optical delay waveguide loop through the optical switch on the right side, generating a signal that controls the optical switch on the right side to be an "off" state.

In a second implementation manner of the third aspect, after sending, by the controller, the control signal to a particular optical switch, the method further includes deleting mapping relationship information that corresponds to the determined optical delay waveguide loop and that is stored in the storage unit.

According to a fourth aspect, an optical buffer is further provided. The optical buffer includes a first waveguide, a first optical delay waveguide loop and a controller. The first waveguide includes a first arm and a second arm. A first end of the first arm is an input end of the optical buffer. A second end of the second arm is an output end of the optical buffer. A second end of the first arm connects to a first end of the second arm. The first optical delay waveguide loop connects to the first arm at a first end using a first optical switch. The first optical delay waveguide loop connects to the second arm at a second end using a second optical switch. The controller connects to the first optical switch and the second optical switch respectively. After the first waveguide receives a first optical signal from the first end of the first arm, the controller turns on the first optical switch to allow the first optical signal to enter the first optical delay waveguide loop to be buffered. Furthermore, the controller turns on the second optical switch to allow the first buffered optical signal to exit the second arm of the first waveguide at the output end when the first optical signal is need to be outputted.

According to a fifth aspect, an optical buffer is further provided. The optical buffer includes a first waveguide and a first optical delay waveguide loop. The first waveguide includes an input arm and an exit arm that are directly connected, and the input arm is also connected to the exit arm through the first optical delay waveguide loop. The first optical delay waveguide loop includes a first input switch connected to the input arm and a first exit switch connected to the exit arm. The first waveguide is configured to receive a first optical signal at the input arm. The first input switch is configured to allow the first optical signal to pass from the input arm to the first optical delay waveguide loop. The first exit switch is configured to allow the first optical signal to exit from the first optical delay waveguide loop through the exit arm.

Based on the foregoing technical solutions, in the annular optical buffer and the methods for storing and reading an optical signal based on the annular optical buffer that are provided in the embodiments of the present disclosure, it can be implemented that an on-off status of an optical switch in an annular optical buffer is controlled according to an instruction from an external device in order to implement access to an optical signal, and because the access to the optical signal is not a sequential operation, it is impossible to implement unordered random storage and reading of an optical signal.

BRIEF DESCRIPTION OF DRAWINGS

To describe the technical solutions in the embodiments of the present disclosure more clearly, the following briefly describes the accompanying drawings required for describing the embodiments of the present disclosure. The accompanying drawings in the following description show merely some embodiments of the present disclosure.

DESCRIPTION OF EMBODIMENTS

The following clearly describes the technical solutions in the embodiments of the present disclosure with reference to the accompanying drawings in the embodiments of the present disclosure. The described embodiments are a part rather than all of the embodiments of the present disclosure.

Figure 2:
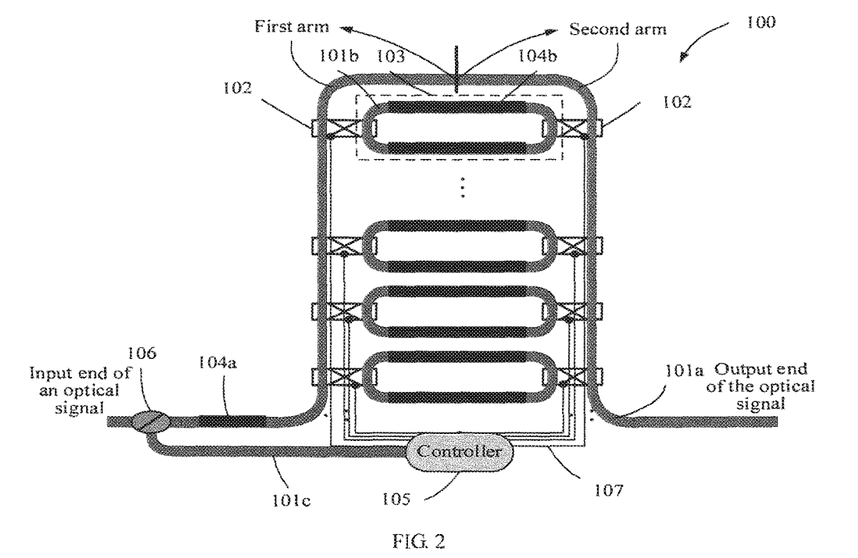
FIG. 2 is a schematic structural diagram of an annular optical buffer according to an embodiment of the present disclosure.

An embodiment of the present disclosure provides an annular optical buffer. Referring to FIG. 2, the annular optical buffer 100 includes a first bent straight-through waveguide 101a, n-shaped, connecting an input end and an output end of an optical signal, functioning as a transmission bus of the optical signal, and configured to transmit, to the output end, the optical signal input from the input end, multiple optical delay waveguide loops 103, arranged transversely and in parallel on two arms of the first bent straight-through waveguide 101a, where on and off of an optical path that is on two sides of each optical delay waveguide loop 103 and the two arms of the first bent straight-through waveguide 101a are implemented using a pair of optical switches 102, and the foregoing multiple optical delay waveguide loops 103 are configured to temporarily store optical signals, multiple pairs of optical switches 102, whose quantity is the same as that of the multiple optical delay waveguide loops 103, where each pair of optical switches 102 are configured to control the on and off of the optical path that is on the two arms of the first bent straight-through waveguide 101a and the two sides of the optical delay waveguide loop 103 corresponding to each pair of optical switches 102, a beamsplitter 106, disposed at an input end of the first bent straight-through waveguide 101a, and configured to obtain a part of optical signal by splitting the optical signal that is input from the input end and transfer the part of optical signal to a controller 105 through a second bent straight-through waveguide 101c, a slow light effect waveguide 104a, disposed on the first bent straight-through waveguide 101a that is between an optical switch closest to the input end and the beamsplitter, and configured to slow a transmission rate of an optical signal transmitted within the slow light effect waveguide 104a, and the controller 105, connected to the beamsplitter 106 using the second bent straight-through waveguide 101c, connected to an external device, connected to each optical switch of the multiple pairs of optical switches 102 using a control signal line 107, and configured to receive the part of optical signal obtained by performing splitting by the beamsplitter 106, perform optical-to-electrical conversion on this part of optical signal to obtain an electrical signal, and parse a data packet of the foregoing electrical signal, generate an optical signal transmission request according to information obtained by performing the parsing, send this transmission request to the external device, receive an instruction that is sent by the external device and used for storing an optical signal in the annular optical buffer, generate a control signal according to the storage instruction using the information obtained by performing the parsing, send the control signal to a particular optical switch 102, and control an on-off status of the particular optical switch 102 such that an optical signal transmitted in the first bent straight-through waveguide 101a enters an optical delay waveguide loop 103 corresponding to this particular optical switch, or configured to receive an instruction that is sent by the external device and used for outputting an optical signal temporarily stored in a particular optical delay waveguide loop from the optical delay waveguide loop, generate a control signal according to the output instruction, and send the control signal to a particular optical switch 102, and control an on-off status of this particular optical switch 102 such that an optical signal that is temporarily stored in an optical delay waveguide loop 103 corresponding to the particular optical switch 102 is output from the optical delay waveguide loop 103.

A transmission rate of an optical signal in the first bent straight-through waveguide 101a can be slowed using the slow light effect waveguide 104a, and in this way, it can be ensured that the controller 105 has sufficient time to generate a control signal, and implements control over an on-off status of a particular optical switch of the annular optical buffer in order to implement storage of an optical signal or read of an optical signal.

It should be noted that there are multiple pairs of optical switches and multiple optical delay waveguide loops connected one by one to the multiple pairs of optical switches in FIG. 2, and for clarity of identifiers of the accompanying drawing, only one pair of optical switches and an optical delay waveguide loop that are on the top are marked with reference signs in FIG. 2. It can be understood by a person skilled in the art that the foregoing reference signs also represent other pairs of optical switches and other optical delay waveguide loops.

Figure 3:
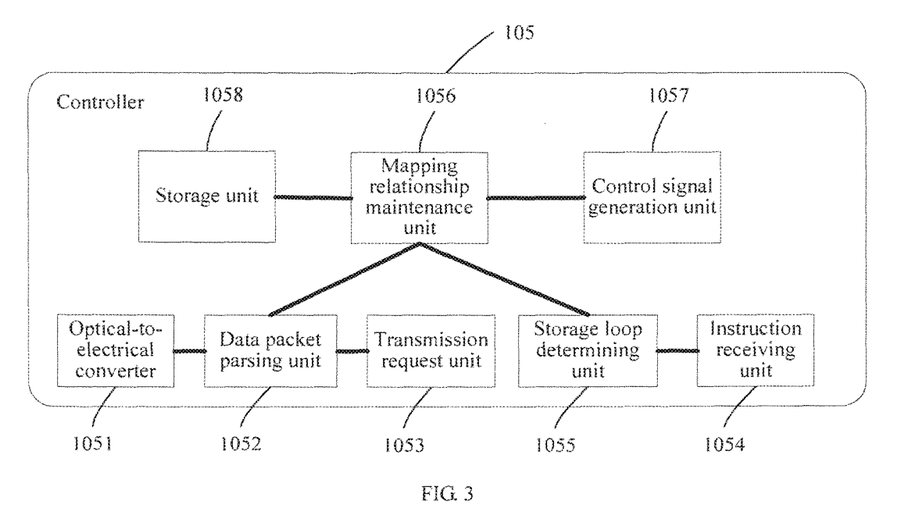
FIG. 3 is a schematic structural diagram of a first embodiment of a controller of an annular optical buffer according to an embodiment of the present disclosure.

Optionally, in a specific implementation process, referring to FIG. 3, the foregoing controller 105 includes an optical-to-electrical converter 1051 configured to receive the part of optical signal obtained by performing splitting by the beamsplitter 106, and perform optical-to-electrical conversion on this part of optical signal to obtain the electrical signal, a data packet parsing unit 1052 configured to parse the data packet of the electrical signal, acquire header information of the data packet of the electrical signal, and extract a destination address of the data packet from the header information, a transmission request unit 1053 configured to generate the optical signal transmission request according to the destination address, and send the transmission request to the external device, an instruction receiving unit 1054 configured to receive the instruction that is sent by the external device and used for storing an optical signal in the annular optical buffer, a storage loop determining unit 1055 configured to determine, according to the storage instruction, one optical delay waveguide loop from optical delay waveguide loops that store no optical signal and that are in the annular optical buffer, a mapping relationship maintenance unit 1056 configured to establish mapping relationship information of the destination address and the determined optical delay waveguide loop using the destination address, obtained by performing the parsing, of the data packet, and send the mapping relationship information to a storage unit, a control signal generation unit 1057 configured to generate a control signal that is sent to a particular optical switch corresponding to the determined optical delay waveguide loop, where the control signal is used to control an on-off status of the particular optical switch, and the storage unit 1058 configured to store a mapping relationship between the destination address and the optical delay waveguide loop.

Figure 4:
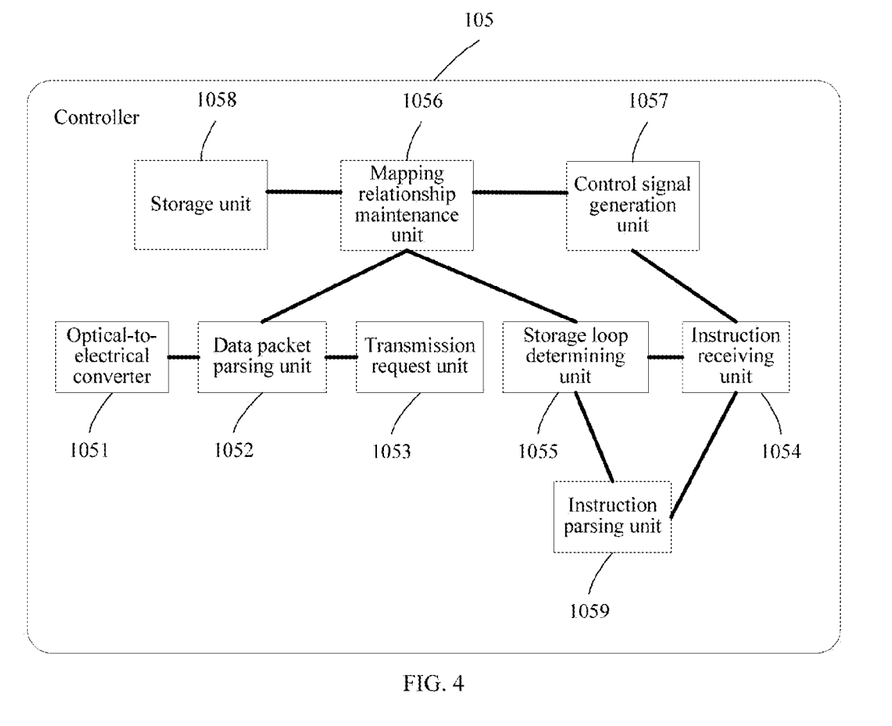
FIG. 4 is a schematic structural diagram of a second embodiment of a controller of an annular optical buffer according to an embodiment of the present disclosure.

In an implementation process, referring to FIG. 4, the controller 105 further includes the instruction receiving unit 1054, which is further configured to receive the instruction that is sent by the external device and used for outputting an optical signal temporarily stored in a particular optical delay waveguide loop from the optical delay waveguide loop, an instruction parsing unit 1059 configured to parse the received output instruction, and extract, from the received output instruction, a destination address of an optical signal needing to be output. The storage loop determining unit 1055, further configured to search for a mapping relationship, stored in the storage unit, between the destination address and the optical delay waveguide loop according to the extracted destination address, and determine the optical delay waveguide loop corresponding to the destination address, the control signal generation unit 1057, further configured to generate, according to the output instruction, a control signal that is sent to a particular optical switch corresponding to the determined optical delay waveguide loop, where the control signal is used to control an on-off status of the particular optical switch, and the mapping relationship maintenance unit 1056, further configured to delete the mapping relationship information that corresponds to the determined optical delay waveguide loop and that is stored in the storage unit.

Figure 5A:
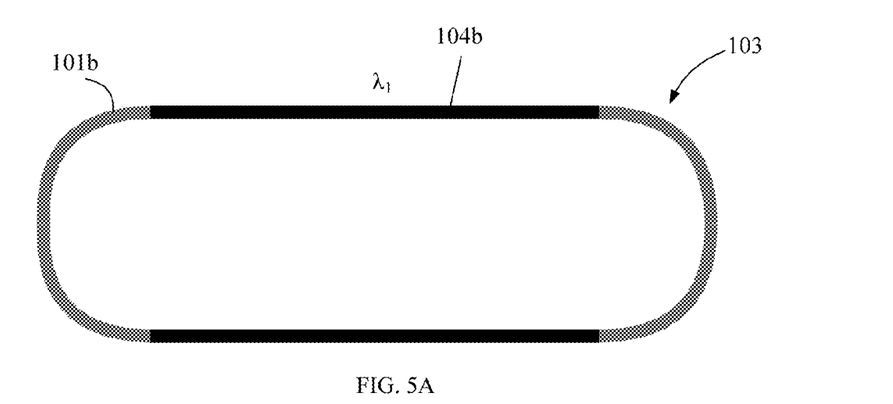
FIG. 5A is a schematic structural diagram of a first embodiment of an optical delay waveguide loop according to an embodiment of an annular optical buffer of the present disclosure.

Optionally, referring to FIG. 5A, each optical delay waveguide loop 103 in the foregoing annular optical buffer may include a slow light effect waveguide 104b and a bent waveguide 101b, where the slow light effect waveguide 104b is configured to slow a transmission rate of an optical signal in the optical delay waveguide loop 103, to implement that an optical signal of a larger capacity is stored in the optical delay waveguide loop 103. The foregoing slow light effect waveguide 104b may be implemented using a photonic crystal waveguide (PCW), electromagnetically induced transparency (EIT), coherent population oscillation (CPO), stimulated Brillouin scattering (SBS), or another method. The bent waveguide 101b may be implemented using a silicon waveguide or another waveguide, which is not limited in this embodiment of the present disclosure.

Figure 5B:
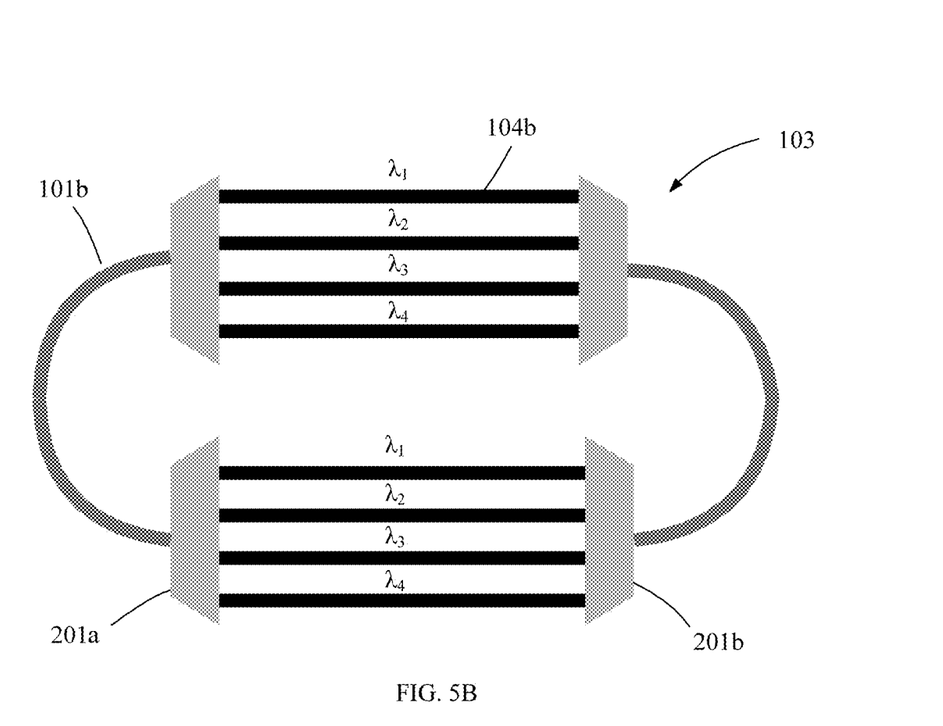
FIG. 5B is a schematic structural diagram of a second embodiment of an optical delay waveguide loop according to an embodiment of an annular optical buffer of the present disclosure.

Optionally, the optical delay waveguide loop 103 may be a PCW loop corresponding to a single wavelength, as shown in FIG. 5A, or may be a PCW loop corresponding to WDM, that is, multiple PCW loops respectively correspond to multiple wavelengths, as shown in FIG. 5B. In FIG. 5A, the slow light effect waveguide 104b plays a role of slowing an optical transmission rate of only an optical signal with a wavelength of $\lambda_1$ (that is, a slow light effect). In FIG. 5B, there are four PCWs, which respectively produce a slow light effect on optical signals with wavelengths of $\lambda_1$, $\lambda_2$, $\lambda_3$, and $\lambda_4$. For a WDM optical signal including M wavelengths (where M is an integer and M>1), first, the WDM optical signal including M wavelengths needs to be demultiplexed into M single-wavelength optical signals with different wavelengths using a wavelength division demultiplexer 201a. Then, the foregoing M single-wavelength optical signals with different wavelengths pass through M single-wavelength optical delay waveguide loops, and optical signal delay is separately performed on the M single-wavelength optical signals with different wavelengths, and then WDM is performed, using a wavelength division multiplexer 201b, on the delayed M single-wavelength optical signals with different wavelengths to obtain a WDM optical signal.

Figure 6:
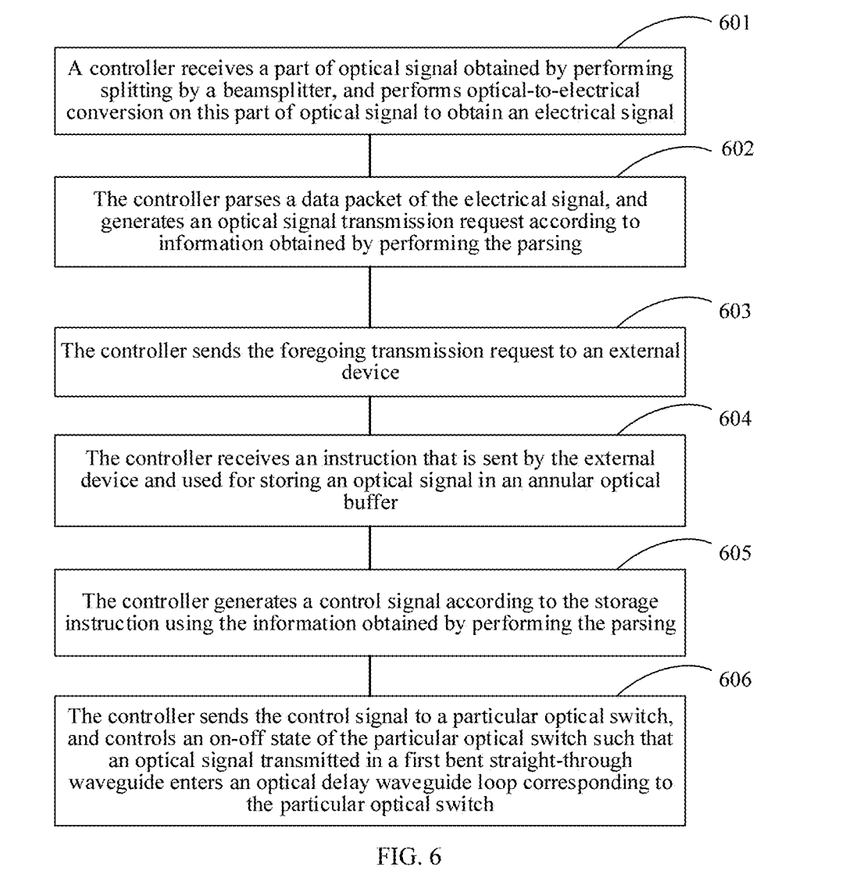
FIG. 6 is a schematic flowchart of storing an optical signal using an annular optical buffer according to an embodiment of the present disclosure.

Another embodiment of the present disclosure provides a method for storing an optical signal that is applied to the foregoing annular optical buffer. Referring to FIG. 6, the method includes the following steps.

Step 601: A controller receives a part of optical signal obtained by performing splitting by a beamsplitter, and performs optical-to-electrical conversion on this part of optical signal to obtain an electrical signal.

The beamsplitter used above is configured to obtain a part of optical signal by splitting an optical signal that is input from an input end of the optical signal. In the prior art, the beamsplitter has multiple implementation manners such as a diffraction grating type, a prism type, and a waveguide type, and details are not described herein.

A process of performing optical-to-electrical conversion on the optical signal to obtain the electrical signal is an existing photoelectric detection process, and details are not described herein.

Step 602: The controller parses a data packet of the electrical signal, and generates an optical signal transmission request according to information obtained by performing the parsing.

Furthermore, parsing, by the controller, a data packet of the electrical signal obtained by means of optical-to-electrical conversion, and generating an optical signal transmission request according to information obtained by performing the parsing includes the following.

(1): Perform data parsing on the data packet of the electrical signal, acquire header information of the data packet of the electrical signal, and extract a destination address of this data packet from the header information.

Figure 7:
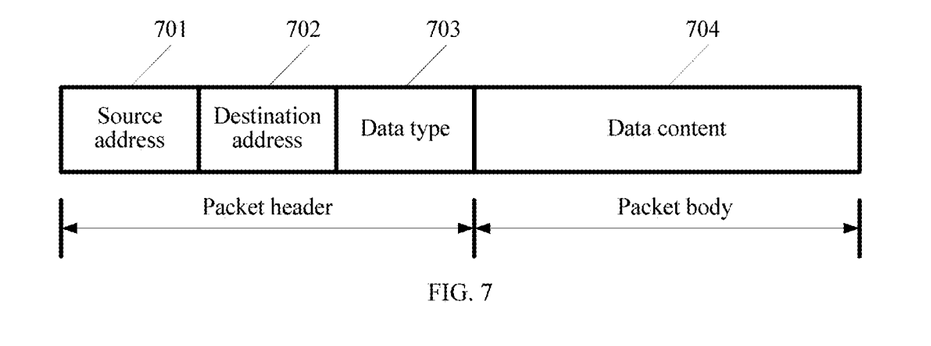
FIG. 7 is a schematic diagram of a packet structure of a data packet of an electrical signal according to an embodiment of the present disclosure.

A packet structure of the data packet of the electrical signal is shown in FIG. 7, and this packet structure includes a packet header and a packet body, where the packet header includes a source address 701, a destination address 702, and a data type 703, and the packet body corresponds to detailed included data content 704.

As can be seen from the foregoing packet structure, to acquire the destination address 702 of the foregoing data packet, only a packet header of the data packet of the electrical signal needs to be parsed. For this characteristic, in a specific implementation process, the following manners may be used to acquire the destination address 702 of the foregoing data packet according to different types of optical signals.

A): When the optical signal is a single-wavelength optical signal, where a wavelength is marked as $\lambda_0$, the controller performs optical-to-electrical conversion on this single-wavelength optical signal to obtain an electrical signal, parses the electrical signal, extracts only header information, for example, if a header occupies 24 bytes, only 24 bytes need to be extracted, and acquires a destination address of the optical signal from the extracted header information.

It should be noted that the foregoing packet structure of the data packet of the electrical signal may be specified in a communication protocol, similar to the transmission control protocol (TCP)/Internet Protocol (IP) communication protocol, of an optical transmission system, which is not extended and limited in this embodiment of the present disclosure.

B): When the optical signal is a multi-wavelength optical signal, where wavelengths are respectively marked as, $\lambda_0$, $\lambda_1$, $\lambda_2$, $\lambda_3$, and the like, at a transmit end of the optical signal, optical modulation may be performed on header information using a fixed wavelength $\lambda_0$, and optical modulation may be performed on content in a packet body using $\lambda_1$, $\lambda_2$, and $\lambda_3$. In this way, the controller needs to detect only an optical signal with a wavelength $\lambda_0$, extract header information of the optical signal, and acquire a destination address of the optical signal from the extracted header information.

It should be noted that in the foregoing multi-wavelength optical signal, the optical modulation performed on the header information using the optical signal with the wavelength $\lambda_0$ may be set in a communication protocol of a transmit end and a receive end of an optical transmission system.

(2): Generate, according to the obtained destination address of the data packet, a transmission request for sending the optical signal to the destination address.

In a specific implementation process, the destination address of the foregoing data packet is an address of a destination end receiving the optical signal. This destination end may be a processing apparatus for another optical signal.

Step 603: The controller sends the foregoing transmission request to an external device.

Further, the controller sends, to the external device, the transmission request for sending the optical signal, and the foregoing external device may be a central processing unit (CPU) of an optical signal processing system, or an optical switch in an optical switching network, or the like, which is not limited in this embodiment of the present disclosure.

Step 604: The controller receives an instruction that is sent by the external device and used for storing an optical signal in the annular optical buffer.

The foregoing external device sends the instruction for storing an optical signal in the annular optical buffer to the controller. In a specific application, the following application scenario exists. When the external device is an optical switch, and when a path through which the optical switch arrives at the destination address of the foregoing data packet is occupied, the foregoing optical switch sends the instruction for storing an optical signal in the annular optical buffer to the controller.

Step 605: The controller generates a control signal according to the storage instruction using the information obtained by performing the parsing.

Further, the controller determines, according to the foregoing storage instruction for storing an optical signal in the annular optical buffer, one optical delay waveguide loop from optical delay waveguide loops that store no optical signal and that are in the annular optical buffer, and generates a signal that controls an optical switch on a left side of the determined optical delay waveguide loop to be an "on" state, and after the optical signal is imported into the determined optical delay waveguide loop through the optical switch on the left side, generates a signal that controls the optical switch on the left side to be an "off" state.

After determining, according to the storage instruction, one optical delay waveguide loop from optical delay waveguide loops that store no optical signal and that are in the annular optical buffer, the foregoing method further includes establishing a mapping relationship between the foregoing destination address obtained by means of parsing and the foregoing determined optical delay waveguide loop, and storing the foregoing mapping relationship in a storage unit of the controller.

For the mapping relationship, stored in the storage unit of the controller, between destination addresses and the multiple optical delay waveguide loops in the annular optical buffer, and the foregoing mapping relationship may be implemented using a table, as shown in the following table (Table 1):

TABLE 1

| Destination address | Storage unit |
|---|---|
| 0001 | Optical delay waveguide loop 1 |
| 0010 | Optical delay waveguide loop 2 |
| ... | ... |

Table 1 already stores two mapping relationships between destination addresses and storage units.

In addition, in a process of determining, according to the foregoing storage instruction, one optical delay waveguide loop from optical delay waveguide loops that store no optical signal and that are in the annular optical buffer, when it is found that all optical delay waveguide loops of the annular optical buffer already store optical signals, a communication message for discarding the optical signal is sent to the external device.

Step 606: The controller sends the control signal to a particular optical switch, and controls an on-off status of the particular optical switch such that an optical signal transmitted in a first bent straight-through waveguide enters an optical delay waveguide loop corresponding to the particular optical switch.

Further, when the determined optical delay waveguide loop is a second optical delay waveguide loop, the controller generates, according to an instruction for storing an optical signal in the annular optical buffer, a signal that controls an optical switch on a left side of the second optical delay waveguide loop to be an "on" state. In this way, the foregoing optical signal to be stored in the annular optical buffer enters the second optical delay waveguide loop through the first bent straight-through waveguide 101a, and after the optical signal is imported into the second optical delay waveguide loop through the optical switch on the left side, a signal that controls the optical switch on the left side is generated, and sent to the second optical delay waveguide loop to be an "off".

In a specific implementation process, sending moments of control signals of the "on" state of the optical switch on the left side and the "off" state of the optical switch on the left side of the optical delay waveguide loop are determined in the following manner (referring to FIG. 2) it is assumed that the controller 105 takes a time of n1 to process the optical signal, a time of conversion between on and off states of the optical switch is n2, and a time in which the optical signal is transferred from the beamsplitter 106 to the optical switch 102 is n3, where $n_3 \geq n_1 + n_2$. If a time in which an optical signal passes through the optical switch 102 is n4, starting from receiving the part of optical signal obtained by performing splitting by the beamsplitter 106, the controller 105 sends the signal of the "off" state of the optical switch to the optical switch 102 after a time slightly greater than or equal to n3+n4, and turns off the optical switch after a time of n2, and the optical signal needs to take a time of n5 to be transmitted in the optical delay waveguide loop 103 for a round, where $n_5 \geq n_4 + n_2$ and $n_5 < 2*(n_4 + n_2)$.

By selecting the sending time of the control signal of the "on" and "off" states of the optical switch, the optical signal can be stored in a particular optical delay waveguide loop. It should be noted that time control of a storage process of an optical delay waveguide loop corresponding to another optical switch on the left side, and the like is basically the same as the foregoing selection, and a slight difference lies in a time that the optical signal takes to be transmitted from the beamsplitter 106 to another optical switch. However, the foregoing difference is almost negligible (because a speed at which the optical signal is transmitted in a waveguide approaches to the speed of light, differences between times that the optical signal takes to arrive at all optical switches on the left side of the annular optical buffer are very small, and are negligible compared with this time period of n1+n2).

Figure 8:
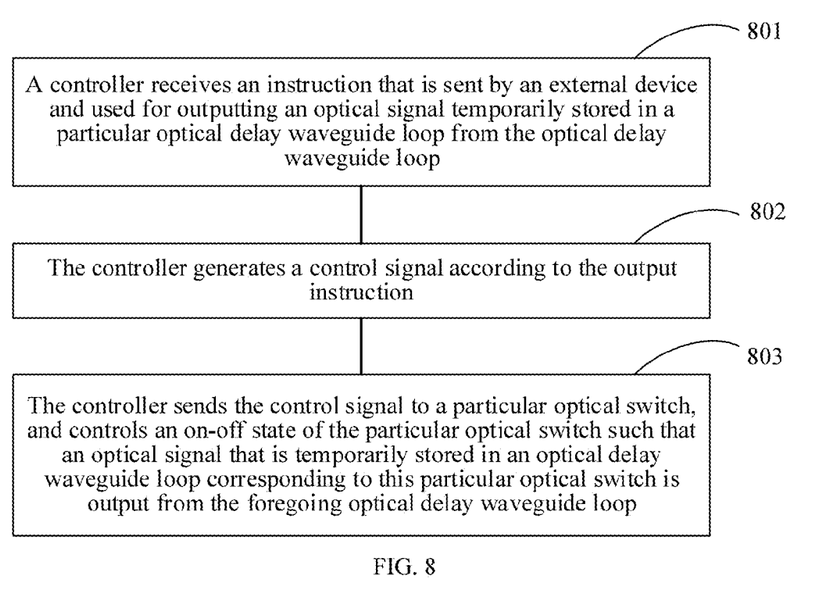
FIG. 8 is a schematic flowchart of reading an optical signal using an annular optical buffer according to an embodiment of the present disclosure.

Another embodiment of the present disclosure further provides a method for reading an optical signal using the foregoing annular optical buffer. Referring to FIG. 8, the method includes the following steps.

Step 801: A controller receives an instruction that is sent by an external device and used for outputting an optical signal temporarily stored in a particular optical delay waveguide loop from the optical delay waveguide loop.

The instruction for outputting an optical signal from an optical delay waveguide loop of the annular optical buffer is sent by the external device, and the external device may be a CPU of an optical signal processing system, or an optical switch in an optical switching network, or the like, which is not limited in this embodiment of the present disclosure.

Step 802: The controller generates a control signal according to the output instruction.

Furthermore, generating, by the controller, a control signal according to the output instruction includes the following.

(1): The controller acquires, according to the received output instruction, a destination address of an optical signal needing to be output.

Specific implementation scenario 1: when the external device is an optical switch, the foregoing optical switch sends, to the controller, the instruction for outputting an optical signal temporarily stored in a particular optical delay waveguide loop from the optical delay waveguide loop, and after receiving the instruction, the controller determines, according to this instruction, the destination address that corresponds to the optical signal needing to be output. For example, if the optical switch finds that a particular router is not occupied, the optical switch determines, based on a routing table stored by the optical switch, that an optical signal sent to a destination address 0010 needs to be transmitted, through this router, to a receive end corresponding to the destination address in order to determine the destination address 0010 of the optical signal needing to be output.

Specific implementation scenario 2: when the external device is a CPU, the foregoing CPU sends the instruction for outputting an optical signal temporarily stored in a particular optical delay waveguide loop from the optical delay waveguide loop, where the instruction carries a destination address corresponding to the optical signal. The controller parses the output instruction, and extracts the destination address corresponding to the optical signal from the output instruction.

(2): Search for a mapping relationship, stored in a storage unit, between the destination address and the optical delay waveguide loop according to the extracted destination address, and determine the optical delay waveguide loop corresponding to the destination address.

The controller searches a table of the mapping relationship, stored in the storage unit, between the destination address and the optical delay waveguide loop according to the destination address obtained by means of extraction, and determines the optical delay waveguide loop corresponding to the destination address.

(3): Generate, according to the output instruction, a signal that controls an optical switch on a right side of the determined optical delay waveguide loop to be an "on" state, and after the optical signal is exported from the determined optical delay waveguide loop through the optical switch on the right side, generate a signal that controls the optical switch on the right side to be an "off" state.

In a specific implementation process, sending moments of control signals for controlling the optical switch on the right side to be the "on" state and the optical switch on the right side of the optical delay waveguide loop to be the "off" state are determined in the following manner (referring to FIG. 2).

In a process in which the foregoing optical signal is stored in the particular optical delay waveguide loop 103 of the annular optical buffer, the entire optical signal enters the optical delay waveguide loop 103 and the optical signal already passes through an optical switch 102 on the left side. The optical signal takes a time of n4 to enter the optical delay waveguide loop 103 through the optical switch 102 on the left side. Starting from a time at which the controller 105 sends an off control signal to the optical switch 102 on the left side (that is, starting from a moment that is n3+n4 after the controller 105 receives a part of optical signal obtained after the beamsplitter 106 performs beam splitting processing), a time that the optical signal takes to arrive at the optical switch 102 on the right side for the first time should be greater than or equal to n2+n5*1/2. The optical signal is transmitted within the optical delay waveguide loop 103, and a time that the optical signal takes to arrive at the optical switch 102 on the right side again should be greater than or equal to n2+n5*3/2. Subsequently, times that the optical signal takes to arrive at the optical switch 102 on the right side should be sequentially greater than or equal to n2+n5*5/2, n2+n5*7/2, and so on. Because an on-off time of the optical switch 102 on the right side is n2, to acquire the optical signal in the optical delay waveguide loop 103 corresponding to the optical switch 102 on the right side, the controller 105 should send, within a time of n2 before the optical signal arrives at the optical switch 102 on the right side, the control signal to the optical switch 102 on the right side to turn on the optical switch 102 on the right side such that the optical signal arrives at the optical switch 102 on the right side at or after a moment at which the optical switch 102 on the right side is turned on, that is, the optical signal is exported from the optical switch 102 on the right side. Therefore, the controller 105 should send an "on" state control signal to the optical switch 102 on the right side at a moment such as n5*1/2 or n5*3/2 or n5*5/2 or n5*7/2, or the like that is after the foregoing timing starting moment. Therefore, the optical signal needs to take a time of n4 to be completely exported from the optical switch 102 on the right side, that is, the controller 105 sends an "off" state control signal to the optical switch 102 on the right side at a time greater than or equal to n5*3/2 or n5*5/2 or n5*7/2 or n5*9/2 that is after the foregoing timing starting moment, and turns off the optical switch 102 on the right side at a moment of n2 after the time.

Step 803: The controller sends the control signal to a particular optical switch, and controls an on-off state of the particular optical switch such that an optical signal that is temporarily stored in an optical delay waveguide loop corresponding to this particular optical switch is output from the foregoing optical delay waveguide loop.

Optionally, after sending, by the controller, the control signal to a particular optical switch, the method further includes deleting mapping relationship information that corresponds to the determined optical delay waveguide loop and that is stored in the storage unit.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An optical buffer comprising:
a first waveguide comprising a first arm and a second arm, wherein a first end of the first arm is an input end of the optical buffer, wherein a second end of the first arm connects to a first end of the second arm, wherein a second end of the second arm is an output end of the optical buffer, and wherein the first waveguide is configured to receive a first optical signal and a second optical signal at the first end of the first arm;
a first optical delay waveguide loop, wherein the first optical delay waveguide loop is connected to the first arm of the first waveguide at the first end of the first arm using a first optical switch, and wherein the first optical delay waveguide loop is connected to the second arm of the first waveguide at the second end of the second arm using a second optical switch;
a second optical delay waveguide loop connected to the first arm of the first waveguide at the first end of the first arm using a third optical switch, wherein the second optical delay waveguide loop is connected to the second arm of the first waveguide at the second end of the second arm using a fourth optical switch; and
a controller coupled to the first optical switch, the second optical switch, the third optical switch, and the fourth optical switch, wherein the controller is configured to:
turn on the first optical switch to allow the first optical signal to enter the first optical delay waveguide loop and be buffered;
turn on the second optical switch to allow the first buffered optical signal to exit the second arm of the first waveguide at the output end when the first optical signal is needed to be output;
turn on the third optical switch to allow the second optical signal to enter the second optical delay waveguide loop and be buffered; and
turn on the fourth optical switch to allow the second buffered optical signal to exit the second arm of the first waveguide at the output end when the second optical signal is needed to be output.

2. The optical buffer of claim 1, wherein the second optical delay waveguide loop is in parallel with the first optical delay waveguide loop.

3. The optical buffer of claim 1 further comprising a light effect waveguide disposed on the first arm of the first waveguide, wherein the light effect waveguide is configured to reduce a transmission rate of the first optical signal received from the first end of the first arm, and wherein the controller is further configured to turn on the first optical switch before the reduced first optical signal arrives at the first optical switch.

4. The optical buffer of claim 1 further comprising a light effect waveguide disposed on the first optical delay waveguide loop, wherein the light effect waveguide is configured to reduce a transmission rate of the first optical signal buffered in the first optical delay waveguide loop.

5. An optical buffer comprising:
a first waveguide comprising a first arm and a second arm, wherein a first end of the first arm is an input end of the optical buffer, wherein a second end of the first arm connects to a first end of the second arm, wherein a second end of the second arm is an output end of the optical buffer, and wherein the first waveguide is configured to receive a first optical signal at the first end of the first arm;
a first optical delay waveguide loop, wherein the first optical delay waveguide loop is connected to the first arm of the first waveguide at a first end of the first arm using a first optical switch, and wherein the first optical delay waveguide loop is connected to the second arm of the first waveguide at the second end of the second arm using a second optical switch;
a controller coupled to the first optical switch and the second optical switch, wherein the controller is configured to:
turn on the first optical switch to allow the first optical signal to enter the first optical delay waveguide loop and be buffered; and
turn on the second optical switch to allow the first buffered optical signal to exit the second arm of the first waveguide at the output end when the first optical signal is needed to be output;
a second waveguide; and
a beamsplitter disposed at the input end of the optical buffer, wherein one end of the second waveguide is configured to connect to the beamsplitter, wherein another end of the second waveguide is configured to connect to the controller, wherein the beamsplitter is configured to:
obtain a part of the first optical signal by splitting the first optical signal received from the first end of the first arm; and
transfer the part of the first optical signal to the controller through the second waveguide, and
wherein the controller is further configured to:
obtain a destination address of the first optical signal by parsing the part of the first optical signal; and
store a mapping relationship between the destination address and the first optical delay waveguide loop after turning on the first optical switch.

6. The optical buffer of claim 5, wherein before turning on the second optical switch, the controller is further configured to:
receive a request for outputting the first optical signal, wherein the request comprises the destination address of the first optical signal; and
determine the first optical delay waveguide loop buffering the first optical signal according to the mapping relationship between the destination address and the first optical delay waveguide loop.

7. An optical buffer comprising:
a first optical delay waveguide loop;
a second optical delay waveguide loop;
a controller; and
a first waveguide comprising an input arm and an exit arm directly connected to the input arm,
wherein the first optical delay waveguide loop comprises a first input switch connected to the input arm and a first exit switch connected to the exit arm,
wherein the second optical delay waveguide loop comprises a second input switch connected to the input arm and a second exit switch connected to the exit arm,
wherein the first waveguide is configured to receive a first optical signal and a second optical signal at the input arm,
wherein the controller is coupled to the first input switch, the second input switch, the first exit switch, and the second exit switch, and
wherein the controller is configured to:
turn on the first input switch to allow the first optical signal to travel from the input arm to the first optical delay waveguide loop and be buffered;
turn on the first exit switch to allow the first buffered optical signal to exit through the exit arm;
turn on the second input switch to allow the second optical signal to travel from the input arm to the second optical delay waveguide loop and be buffered; and
turn on the second exit switch to allow the second buffered optical signal to exit through the exit arm.

8. The optical buffer of claim 7, wherein the second optical delay waveguide loop is in parallel with the first optical delay waveguide loop.

9. The optical buffer of claim 7, further comprising a light effect waveguide disposed on the input arm of the first waveguide, wherein the light effect waveguide is configured to reduce a transmission rate of the first optical signal received from the input arm, and wherein the controller is configured to turn on the first input switch before the reduced first optical signal arrives at the first input switch.

10. An optical buffer comprising:
a first optical delay waveguide loop;
a first waveguide comprising an input arm and an exit arm directly connected to the input arm;
a controller;
a second waveguide; and
a beamsplitter disposed at the input arm,
wherein the first optical delay waveguide loop comprises a first input switch connected to the input arm and a first exit switch connected to the exit arm,
wherein the first waveguide is configured to receive a first optical signal at the input arm,
wherein the beamsplitter connects to the controller through the second waveguide,
wherein the beamsplitter is configured to:
obtain a part of the first optical signal by splitting the first optical signal received from the input arm; and
transfer the part of the first optical signal to the controller through the second waveguide, and
wherein the controller is coupled to the first input switch and the first exit switch, and
wherein the controller is configured to:
turn on the first input switch to allow the first optical signal to travel from the input arm to the first optical delay waveguide loop and be buffered;
turn on the first exit switch to allow the first buffered optical signal to exit through the exit arm;
obtain a destination address of the first optical signal by parsing the part of the first optical signal; and
store a mapping relationship between the destination address and the first optical delay waveguide loop after turning on the first optical switch.

11. The optical buffer of claim 10, wherein before turning on the first exit switch, the controller is further configured to:
receive a request for outputting the first optical signal, wherein the request comprises the destination address of the first optical signal; and
determine the first optical delay waveguide loop buffering the first optical signal according to the mapping relationship between the destination address and the first optical delay waveguide loop.

12. A method for storing an optical signal using an optical buffer, wherein the optical buffer comprises a first waveguide, a second optical delay waveguide loop, a first optical delay waveguide loop, and a controller, and wherein the method comprises:

receiving, by the first waveguide, a first optical signal at a first end of a first arm of the first waveguide, wherein the first waveguide comprises the first arm and a second arm, wherein the first end of the first arm is an input end of the optical buffer, wherein a second end of the first arm connects to a first end of the second arm, and wherein a second end of the second arm is an output end of the optical buffer;

turning on, by the controller, a first optical switch to allow the first optical signal to enter the first optical delay waveguide loop and be buffered, wherein the first optical delay waveguide loop is connected to the first arm of the first waveguide at the first end of the first arm using the first optical switch;

turning on, by the controller, a second optical switch to allow the first buffered optical signal to exit the second arm of the first waveguide at the output end when the first optical signal is needed to be output, wherein the first optical delay waveguide loop is connected to the second arm of the first waveguide at the second end of the second arm using the second optical switch;

receiving, by the first waveguide, a second optical signal at the first end of the first arm of the first waveguide;

turning on, by the controller, a third optical switch to allow the second optical signal to enter the second optical delay waveguide loop and be buffered, wherein the second optical delay waveguide loop is connected to the first arm of the first waveguide at the first end of the first arm using the third optical switch; and turning on, by the controller, a fourth optical switch to allow the second buffered optical signal to exit the second arm of the first waveguide at the output end when the second optical signal is needed to be output, wherein the second optical delay waveguide loop is connected to the second arm of the first waveguide at the second end of the second arm using the fourth optical switch.

13. The method according to claim 12, wherein the optical buffer further comprises a light effect waveguide disposed on the first arm of the first waveguide, wherein the method further comprises reducing, by the light effect waveguide, a transmission rate of the first optical signal received from the first end of the first arm, and wherein turning on, by the controller, the first optical switch comprises turning on, by the controller, the first optical switch before the reduced first optical signal arrives at the first optical switch.

14. The method according to claim 12, wherein the optical buffer further comprises a light effect waveguide disposed on the first arm of the first waveguide, and wherein the method further comprises reducing, by the light effect waveguide, a transmission rate of the first optical signal buffered in the first optical delay waveguide loop.

15. A method for storing an optical signal using an optical buffer, wherein the optical buffer comprises a first waveguide, a first optical delay waveguide loop, a controller, a second waveguide, and a beamsplitter disposed at an input end of the optical buffer, wherein one end of the second waveguide connects to the beamsplitter, wherein another end of the second waveguide connects to the controller, and wherein the method comprises:

receiving, by the first waveguide, a first optical signal at a first end of a first arm of the first waveguide, wherein the first waveguide comprises the first arm and a second arm, wherein the first end of the first arm is the input end of the optical buffer, wherein a second end of the first arm connects to a first end of the second arm, and wherein a second end of the second arm is an output end of the optical buffer;

turning on, by the controller, a first optical switch to allow the first optical signal to enter the first optical delay waveguide loop and be buffered, wherein the first optical delay waveguide loop is connected to the first arm of the first waveguide at the first end of the first arm using the first optical switch;

turning on, by the controller, a second optical switch to allow the first buffered optical signal to exit the second arm of the first waveguide at the output end when the first optical signal is needed to be output, wherein the first optical delay waveguide loop is connected to the second arm of the first waveguide at the second end of the second arm using the second optical switch;

obtaining, by the beamsplitter, a part of the first optical signal by splitting the first optical signal received from the first end of the first arm;

transferring, by the beamsplitter, the part of the first optical signal to the controller through the second waveguide;

obtaining, by the controller, a destination address of the first optical signal by parsing the part of the first optical signal; and storing, by the controller, a mapping relationship between the destination address and the first optical delay waveguide loop after turning on the first optical switch.

16. The method according to the claim 15, wherein before turning on the second optical, the method further comprises:

receiving, by the controller, a request for outputting the first optical signal, wherein the request comprises the destination address of the first optical signal; and determining, by the controller, the first optical delay waveguide loop buffering the first optical signal according to the mapping relationship between the destination address and the first optical delay waveguide loop.

* * * * *

UNITED STATES PATENT AND TRADEMARK OFFICE
CERTIFICATE OF CORRECTION

PATENT NO. : 9,807,478 B2
APPLICATION NO. : 15/199140
DATED : October 31, 2017
INVENTOR(S) : Liang Song et al.

It is certified that error appears in the above-identified patent and that said Letters Patent is hereby corrected as shown below:

On the Title Page

Column 1, (71) Applicant should read:
(71) Applicant: Huawei Technologies Co., Ltd., Shenzhen (CN)

Page 2, Column 2, Foreign Patent Documents, Line 15, should read:
JP 4431704 B2 1/2010

Signed and Sealed this
Twenty-sixth Day of December, 2017

Joseph Matal
*Performing the Functions and Duties of the
Under Secretary of Commerce for Intellectual Property and
Director of the United States Patent and Trademark Office*